July 3, 1956
R. F. SMITH
2,753,191
LATERAL THRUST ELIMINATING AND VERTICALLY ADJUSTABLE
IMPLEMENT MOUNTING TRACTOR DRAW BAR
Filed March 30, 1953
2 Sheets-Sheet 1
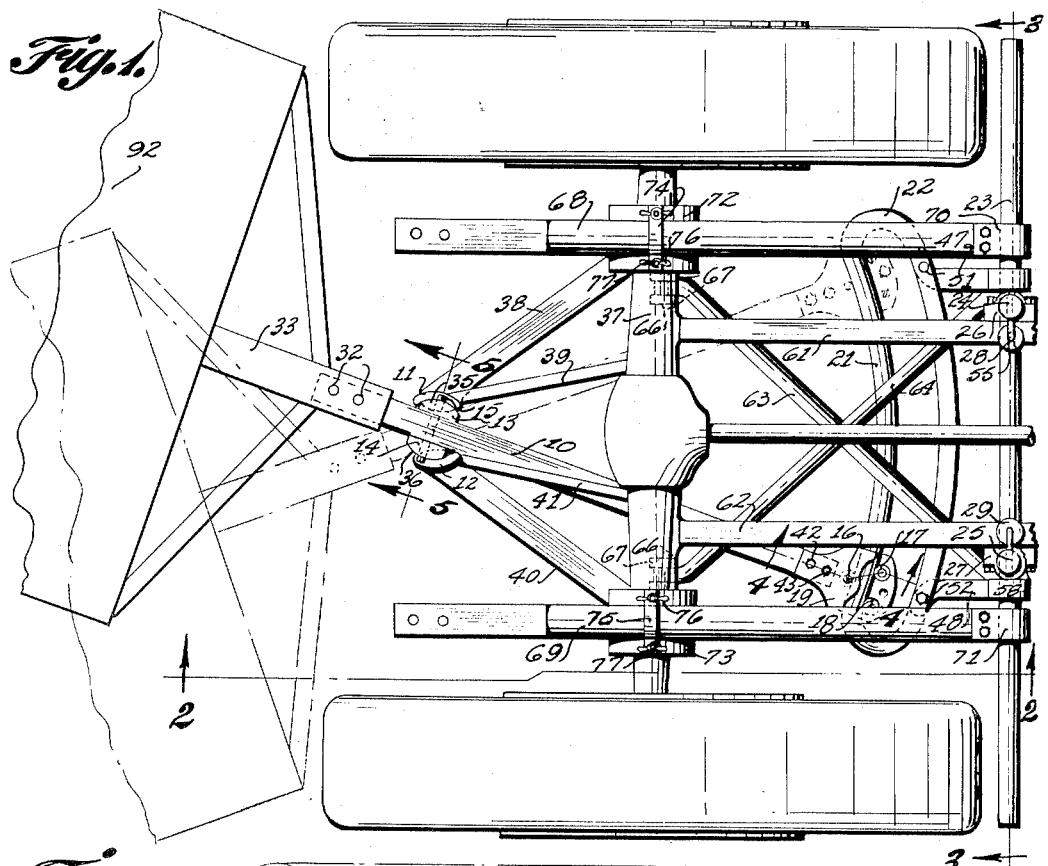
INVENTOR.
Roy F. Smith.
BY Victor J. Evans & Co.
ATTORNEYS July 3, 1956
R. F. SMITH
2,753,191
LATERAL THRUST ELIMINATING AND VERTICALLY ADJUSTABLE
IMPLEMENT MOUNTING TRACTOR DRAW BAR
Filed March 30, 1953
2 Sheets-Sheet 2
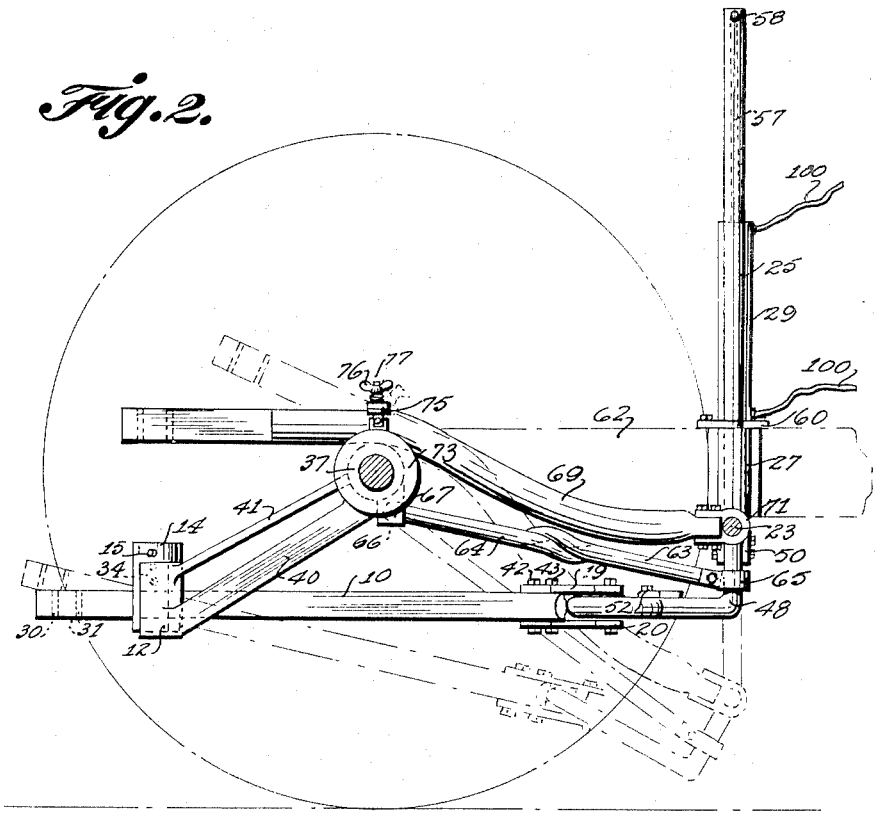
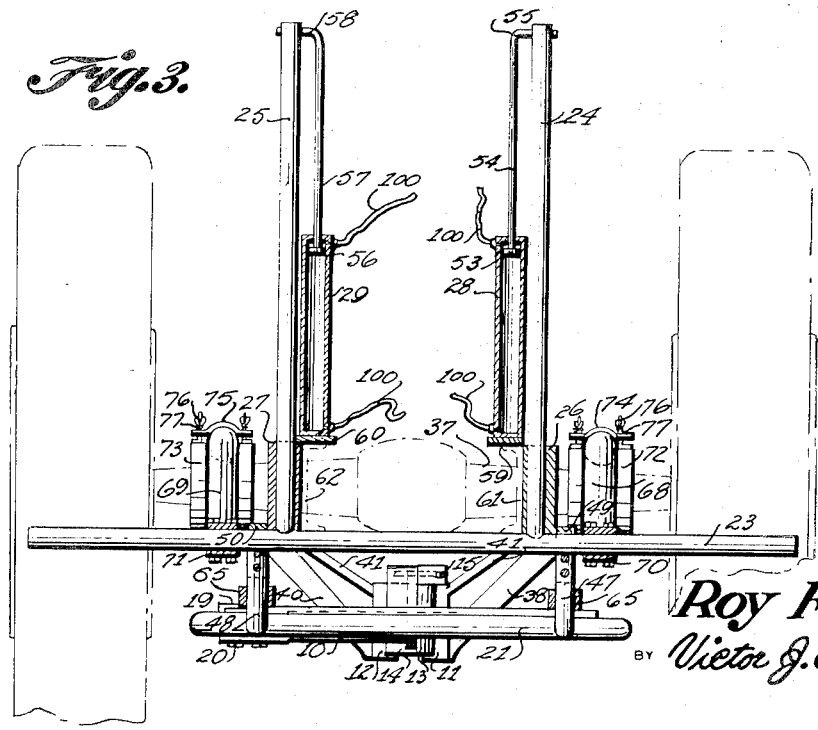
INVENTOR.
Roy F. Smith.
BY Victor J. Evans & Co.
ATTORNEYS

United States Patent Office 2,753,191
Patented July 3, 1956

2,753,191

LATERAL THRUST ELIMINATING AND VERTICALLY ADJUSTABLE IMPLEMENT MOUNTING TRACTOR DRAW BAR

Roy F. Smith, Silt, Colo.

Application March 30, 1953, Serial No. 345,543

1 Claim. (Cl. 280—405)

This invention relates to a draw bar particularly adapted for attaching a farm implement, wagon, trailer, or other vehicle or device to a rear axle housing of a tractor, and in particular a draw bar in which the extended end is supported in a guide in a swivel joint with the opposite end mounted to travel on an arm of a yoke, the radius of which is centered on the swivel joint and in which the swivel joint and yoke are adjustably mounted on the rear axle and chassis of a tractor.

The purpose of this invention is to provide a draw bar and a mounting therefor in which the angle of the draw bar in relation to the longitudinal axis of a towing vehicle changes with the direction of force applied by a vehicle being towed and wherein the elevation of the draw bar mounting and a swivel anchoring point thereof are vertically adjustable to compensate for different types of objects or vehicles attached to the tractor upon which the draw bar is mounted.

Various methods have been used for obtaining flexible connections between towed and towing vehicles, however, where the hitch or draw bar extends from the rear portion of the towing vehicle a side thrust results from the lateral kick as the towing vehicle turns or shifts from a straight line position. This side or lateral thrust exerts comparatively heavy pressure on the connecting elements and when a shock load is transmitted through the connection or hitch resulting from the wheel passing over a rock or dropping into a hole such connections are often bent or broken.

With this thought in mind this invention contemplates a hitch including a draw bar mounted directly below the rear axle housing of a vehicle, such as a tractor with the draw bar supported by a swivel anchoring element on one side of the rear axle and slidably held on the opposite side of the rear axle with a yoke suspended from the chassis of the tractor and which permits the extended end of the draw bar to swing laterally freely.

The object of this invention is, therefore, to provide a draw bar mounting for vehicles, such as tractors in which the draw bar is free to follow the direction of a force resulting from a towed vehicle whereby with a point of the draw bar anchored on the longitudinal axis of a towing vehicle and suspended on a line extended through said anchoring point, lateral thrusts on the hitch or point of connection between the towing and towed vehicle are reduced to a minimum.

Another object of the invention is to provide an improved draw bar mounting for connecting towed vehicles to towing vehicles in which the elevation of the draw bar is adjustable.

A further object of the invention is to provide an improved draw bar mounting which permits the longitudinal axis of a draw bar to follow the direction of a force applied by a towed vehicle in which the mounting is of a simple and economical construction.

With these and other objects and advantages in view the invention embodies a yoke adapted to be mounted on the chassis of a towing vehicle, hydraulic jacks incorporated in the mounting of the yoke for adjusting the elevation thereof, a swivel anchoring joint adapted to be suspended from a rear axle housing of the chassis of the vehicle and a draw bar extended through the swivel joint and slidably mounted on an arcuate bar of the yoke.

Other features and advantages of the invention will appear from the following description taken in connection with the drawings, wherein:

Figure 1 is a plan view of the improved draw bar mounting illustrating the device installed on the rear portion of a tractor.

Figure 2 is a longitudinal section through the rear portion of the tractor taken on line 2—2 of Fig. 1 illustrating the draw bar mounting and showing parts of the mounting in adjusted positions in broken lines.

Figure 3 is a cross section through the draw bar mounting taken on line 3—3 of Fig. 1 and showing the wheels and frame of a tractor upon which the mounting is positioned in broken lines.

Figure 4 is a detail taken on line 4—4 of Fig. 1 showing the connection of the draw bar to a supporting yoke the parts being shown on an enlarged scale.

Figure 5 is a cross section through the anchoring swivel joint taken on line 5—5 of Fig. 1 and also showing the parts on an enlarged scale.

Figure 6 is a longitudinal section through a portion of the mounting illustrating a modification wherein connecting bars are suspended below the rear axle housing of a tractor instead of being positioned on the housing as shown in Figs. 1 and 2.

Figure 7 is a detail showing a plan view of the connection of the end of the draw bar to the supporting yoke and illustrating the use of set collars or clamps for retaining the draw bar in a rigid position.

Referring now to the drawings wherein like reference characters denote corresponding parts the improved draw bar and the mounting therefor of this invention includes a draw bar 10, a swivel connection having arcuate shoes 11 and 12 positioned on the sides of bars or strips 13 and 14 that are secured to the draw bar 10 with a pin 15, rollers 16, 17, and 18 mounted between plates 19 and 20 on one end of the draw bar with the rollers positioned to travel on a rod 21 of a yoke 22 and with the yoke suspended from a rod or support member 23 that is suspended with vertically disposed bars or arms 24 and 25 slidably mounted in bearings 26 and 27 and actuated by hydraulic jacks or cylinders 28 and 29.

The extended end of the draw bar 10 is provided with spaced openings 30 and 31 through which bolts 32 extend for attaching a tongue or the like 33 of a vehicle or other device, to be towed, to a tractor and spaced from the openings 30 and 31 are a plurality of spaced openings 34 through which the pin 15 may be positioned for adjustably connecting the draw bar to the bars 13 and 14.

The bars 13 and 14 are provided with arcuate outer surfaces, as indicated by the numerals 35 and 36 and these surfaces coact with inner surfaces of the shoes 11 and 12 of the anchoring elements whereby the draw bar is free to twist laterally from the position shown in Fig. 1 to that shown in broken lines. The shoes 11 and 12 are suspended from a rear axle housing 37 by struts 38 and 39 on one side and 40 and 41 on the opposite side of the center. The center from which the arcuate surfaces 35 and 36 and inner surfaces of the shoes 11 and 12 are described is position on the longitudinal axis of a tractor or other vehicle upon which the draw bar mounting is positioned.

The plates 19 and 20 are secured to the opposite end of the draw bar with bolts 42 and 43 that extend through openings 44 and 45, respectively in the end of the draw bar and the rollers 16, 17 and 18, which are positioned between the plates are journaled on bolts 46.

The yoke 22 is suspended from the rod 23 with arms 47 and 48, the upper ends of which are secured to the rod 23 with clamps 49 and 50, respectively and the lower ends of which are secured to the yoke with fasteners 51 and 52.

The rod 23 is carried by the vertically disposed bars 24 and 25, which are slidably mounted in the bearings 26 and 27 and the bars are adjusted vertically with the hydraulic jacks 28 and 29. The hydraulic jack or cylinder 28 is provided with a piston 53 on the end of a piston rod 54 and the upper end of the piston rod is connected to the upper end of the bar 24 with a section 55. The jack or cylinder 29 is provided with a piston 56 on the lower end of a connecting rod 57 and the upper end of the rod 57 is connected to the bar 25 with a section 58. The hydraulic jacks or cylinders 28 and 29 are mounted on plates 59 and 60, respectively that are positioned on beams 61 and 62 of the chassis of the tractor upon which the draw bar mounting is positioned.

The rod 23 is supported laterally with diagonal braces 63 and 64, the lower ends of which are connected with clamps 65 to vertical sections of the arms 47 and 48 and the upper ends of which are connected with bolts 66 to plates 67 positioned on the axle housing.

The draw bar mounting is also provided with connecting bars 68 and 69 that are secured to the rod 23 with clamps 70 and 71, respectively and the connecting rods are secured in collars 72 and 73 on the rear axle housing with plates 74 and 75, respectively, which are clamped to the collars with thumb nuts 76 on studs 77.

The connecting rods 68 and 69 may also be formed as illustrated in Fig. 6 wherein rods 78 are suspended with bearing elements 79 from a rear axle 80 with the opposite ends secured by clamps 81 on a rod 82, similar to the rod 23. The rod 78 may be provided with telescoping joints, as indicated by the numeral 83 and the extended ends are provided with openings 84 and 85, similar to the openings 30 and 31 in the end of the draw bar shown in Fig. 2.

In Fig. 7 clamping or set collars 86 and 87 are secured to the arcuate bar 88 of a yoke 89 similar to the bar 21 of the yoke 22 and by this means the end of the draw bar positioned on the yoke may be retained in a fixed position.

In the design shown a draw bar 90, similar to the draw bar 10 is retained on the longitudinal center of a tractor by the collars 86 and 87 which engage opposite sides of plates 91, similar to the plates 19 and 20 between which the rollers that travel on the bar 21 are positioned.

With this mounting a vehicle or the like being towed, as indicated by the numeral 92 is attached to the extended end of the draw bar and as the towing vehicle changes its course laterally the resulting force of the vehicle being towed is applied directly on the center of the longitudinal axis of the towing vehicle whereby lateral strains or thrusts are reduced to a minimum.

The connections of the mounting elements to the rear axle housing or other parts of a vehicle are adapted to be modified to correspond with the vehicle upon which the draw bar mounting is installed and the hydraulic cylinders or jacks may be connected to suitable means for supplying fluid under pressure, the cylinders being provided with connections, as indicated by the numeral 100.

This draw bar and hydraulic cylinder mounting is adapted for controlling mower attachments, bull-dozers and other equipment supported or mounted at either the front or rear of a tractor or the like.

It will be understood, that other modifications, within the scope of the appended claims, may be made in the design and arrangement of the parts without departing from the spirit of the invention.

What is claimed is:

A draw bar mounting comprising a swivel joint for use on a towing vehicle, means for supporting said swivel joint from an axle of the towing vehicle with the joint positioned on the longitudinal axis of the vehicle and to the rear of said axle, a laterally disposed yoke centered on the longitudinal axis of the towing vehicle and positioned on the forward side of the axle thereof, and a draw bar positioned with one end slidably mounted in the joint, the yoke and the opposite end extended through said swivel joint, and vertically disposed hydraulic jacks adapted to be mounted on the towing vehicle and connected to the yoke for vertically adjusting the yoke.

References Cited in the file of this patent

UNITED STATES PATENTS

| | | |
|---|---|---|
| 1,529,941 | Bradley | Mar. 17, 1925 |
| 1,654,417 | Foley | Dec. 27, 1927 |
| 2,162,481 | Fry | June 13, 1939 |
| 2,259,753 | Kucera | Oct. 21, 1941 |
| 2,590,385 | Devereaux | Mar. 25, 1952 |
| 2,625,089 | Pursche | Jan. 13, 1953 |